(12) United States Patent
Watai

(10) Patent No.: US 12,194,818 B2
(45) Date of Patent: Jan. 14, 2025

(54) VEHICLE-MOUNTED DEVICE

(71) Applicant: Mitsubishi Electric Corporation, Tokyo (JP)

(72) Inventor: Atsuki Watai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 402 days.

(21) Appl. No.: 17/635,719

(22) PCT Filed: Oct. 30, 2019

(86) PCT No.: PCT/JP2019/042534
§ 371 (c)(1),
(2) Date: Feb. 16, 2022

(87) PCT Pub. No.: WO2021/084644
PCT Pub. Date: May 6, 2021

(65) Prior Publication Data
US 2022/0281300 A1 Sep. 8, 2022

(51) Int. Cl.
*G01M 13/005* (2019.01)
*B60J 5/10* (2006.01)
*B60J 10/273* (2016.01)

(52) U.S. Cl.
CPC ......... *B60J 10/273* (2016.02); *G01M 13/005* (2013.01)

(58) Field of Classification Search
CPC .......... B60J 10/273; B60J 5/105; B60J 5/106; G01M 13/005

(Continued)

(56) References Cited

U.S. PATENT DOCUMENTS 6,000,348 A * 12/1999 Do ............................ E05D 7/14
109/59 R
7,398,692 B2 * 7/2008 Hiroki .................... F16J 15/104
73/706

(Continued)

FOREIGN PATENT DOCUMENTS

JP      2000211666 A    8/2000
JP      2005106137 A    4/2005

(Continued)

OTHER PUBLICATIONS

Sentrysafe, Alarm Fire/Water Safe, published Oct. 21, 2019, wayback machine archive, pp. 1-11 (pdf).*

(Continued)

*Primary Examiner* — Manglesh M Patel
(74) *Attorney, Agent, or Firm* — Buchanan Ingersoll & Rooney PC

(57) ABSTRACT

A vehicle-mounted device includes a housing that accommodates electronic equipment therein, an openable and closable cover covering an opening of the housing, a sealing member fixed to the housing or the cover, and a pressure sensor fixed to at least one of the cover, the housing, or the sealing member at a position such that the pressure sensor is in contact with the sealing member while the cover is closed. The pressure sensor measures a pressing force received at the sealing member sandwiched between the housing and the cover. The vehicle-mounted device further includes a degradation determination device to determine whether any degradation occurs in the sealing member on the basis of the pressing force measured at the pressure sensor while the cover is closed.

19 Claims, 14 Drawing Sheets

(58) Field of Classification Search
USPC .......................................................... 701/36
See application file for complete search history.

(56) References Cited

U.S. PATENT DOCUMENTS

| | | |
|---|---|---|
| 10,039,401 B1* | 8/2018 | Romanucci .......... A47G 29/141 |
| 2007/0012117 A1 | 1/2007 | Hiroki et al. |
| 2014/0333035 A1 | 11/2014 | Schemmann et al. |
| 2015/0014319 A1* | 1/2015 | Norris .................... B65D 41/02 |
| | | 220/324 |
| 2016/0135315 A1* | 5/2016 | Weber ...................... H02B 1/44 |
| | | 174/50 |
| 2023/0204450 A1* | 6/2023 | Nakamura .............. B61C 17/04 |
| | | 73/592 |

FOREIGN PATENT DOCUMENTS

| | | |
|---|---|---|
| JP | 2007078514 A | 3/2007 |
| JP | 2014008802 A | 1/2014 |
| JP | 2015064346 A | 4/2015 |

OTHER PUBLICATIONS

Sweet Project Cars, How To Easily Install a Security SAFE/Vault in a Car Truck Suv or Semi, published Oct. 25, 2017, youtube.com, p. 1.*

International Search Report (PCT/ISA/210) with translation and Written Opinion (PCT/ISA/237) mailed on Dec. 10, 2019, by the Japan Patent Office as the International Searching Authority for International Application No. PCT/JP2019/042534.

Office Action dated Sep. 9, 2022, issued in corresponding Indian Patent Application No. 202227024277, 5 pages.

* cited by examiner

VEHICLE-MOUNTED DEVICE

TECHNICAL FIELD

The present disclosure relates to a vehicle-mounted device.

BACKGROUND ART

Housings of vehicle-mounted devices installed in vehicles accommodate electronic equipment including power converters, circuit breakers, and transformers, for example. These housings are provided with openings that allow inspection and maintenance of the internal electronic equipment. The openings are covered with covers that can be opened and closed so as to inhibit dust, water drops, and the like, from entering the housings. A typical example of these types of vehicle-mounted devices is disclosed in Patent Literature 1.

CITATION LIST

Patent Literature

Patent Literature 1: Unexamined Japanese Patent Application Publication No. 2014-8802

SUMMARY OF INVENTION

Technical Problem

The control device for a railway vehicle disclosed in Patent Literature 1 includes a housing that accommodates an inverter unit and a control unit, for example. The housing has an opening for maintenance covered with an attachable and detachable cover. The opening may be provided with a sealing member therearound in order to improve the dust resistance and waterproofness of the vehicle-mounted device. The sealing member is sandwiched between the cover and the housing while the cover is closed, and thereby inhibits dust, water drops, and the like, from entering the housing through the opening. Unfortunately, when the resilience of the sealing member decreases due to degradation with age, for example, a gap is formed between the sealing member and the cover or the housing while the cover is closed, thereby impairing the waterproofness and dust resistance of the vehicle-mounted device.

An objective of the present disclosure, which has been accomplished in view of the above situations, is to provide a vehicle-mounted device that can maintain the waterproofness and dust resistance.

Solution to Problem

In order to achieve the above objective, a vehicle-mounted device according to one aspect of the present disclosure includes a housing, a cover, a sealing member, a pressure sensor, and a degradation determination device. The housing has an opening. The cover covers the opening and is openable and closable. The sealing member is fixed to the housing or the cover, and is sandwiched between the housing and the cover while surrounding the opening when the cover is closed. The pressure sensor is fixed to at least one of the cover, the housing, or the sealing member at a position such that the pressure sensor is in contact with the sealing member while the cover is closed. The pressure sensor measures a pressing force received at the sealing member sandwiched between the housing and the cover while the cover is closed. The degradation determination device determines whether any degradation occurs in the sealing member on the basis of the pressing force measured at the pressure sensor while the cover is closed.

Advantageous Effects of Invention

The vehicle-mounted device according to one aspect of the present disclosure includes the pressure sensor fixed to at least one of the cover, the housing, or the sealing member at a position such that the pressure sensor is in contact with the sealing member while the cover is closed, and configured to measure the pressing force received at the sealing member sandwiched between the housing and the cover while the cover is closed. The vehicle-mounted device according to this aspect of the present disclosure can therefore maintain the waterproofness and dust resistance.

DESCRIPTION OF EMBODIMENTS

Figure 1:
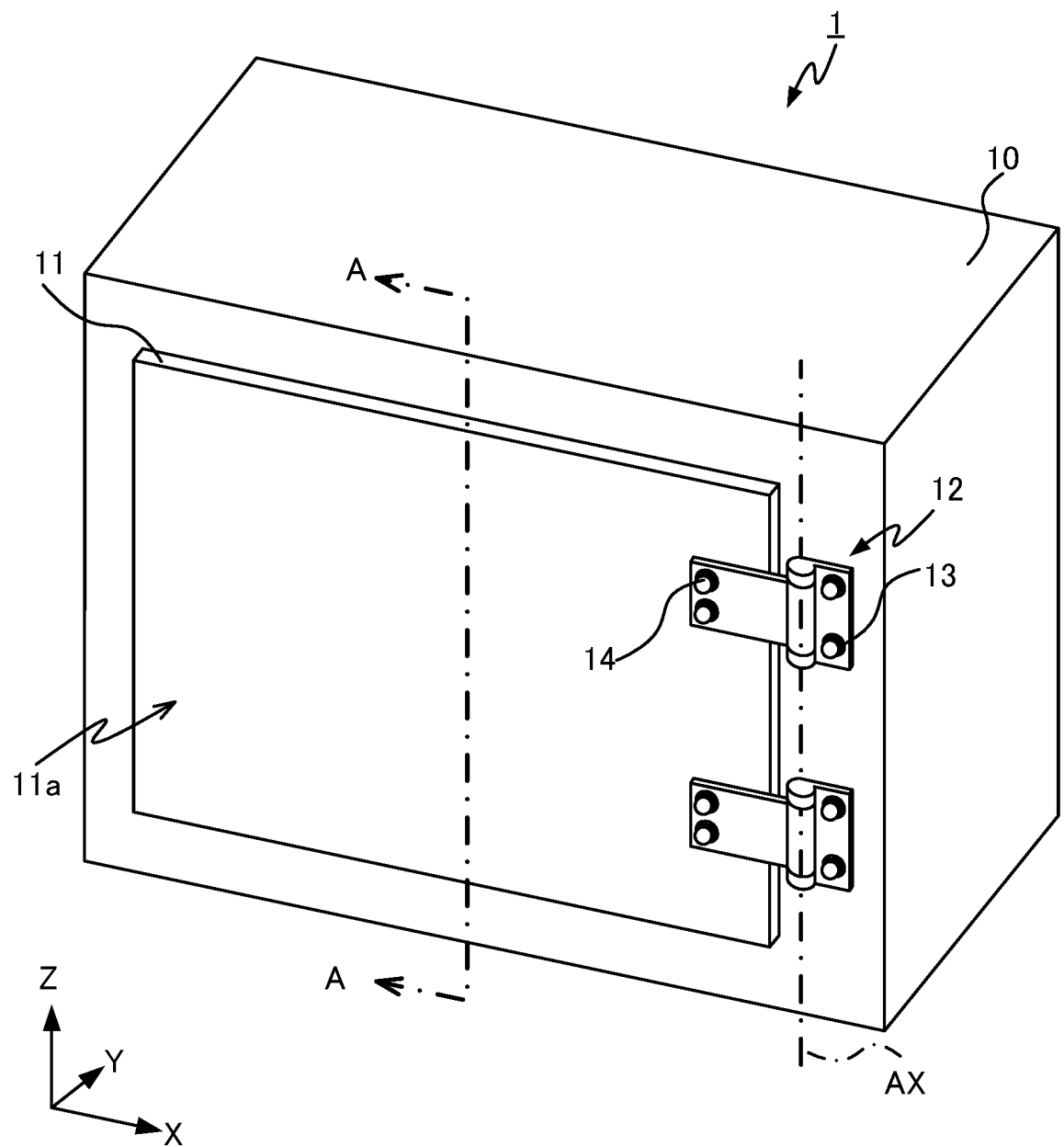
FIG. 1 is a perspective view of a vehicle-mounted device according to Embodiment 1 of the present disclosure.

A vehicle-mounted device according to embodiments of the present disclosure is described in detail below with reference to the accompanying drawings. In the drawings, the components identical or corresponding to each other are provided with the same reference symbol.

Embodiment 1

Figure 2:
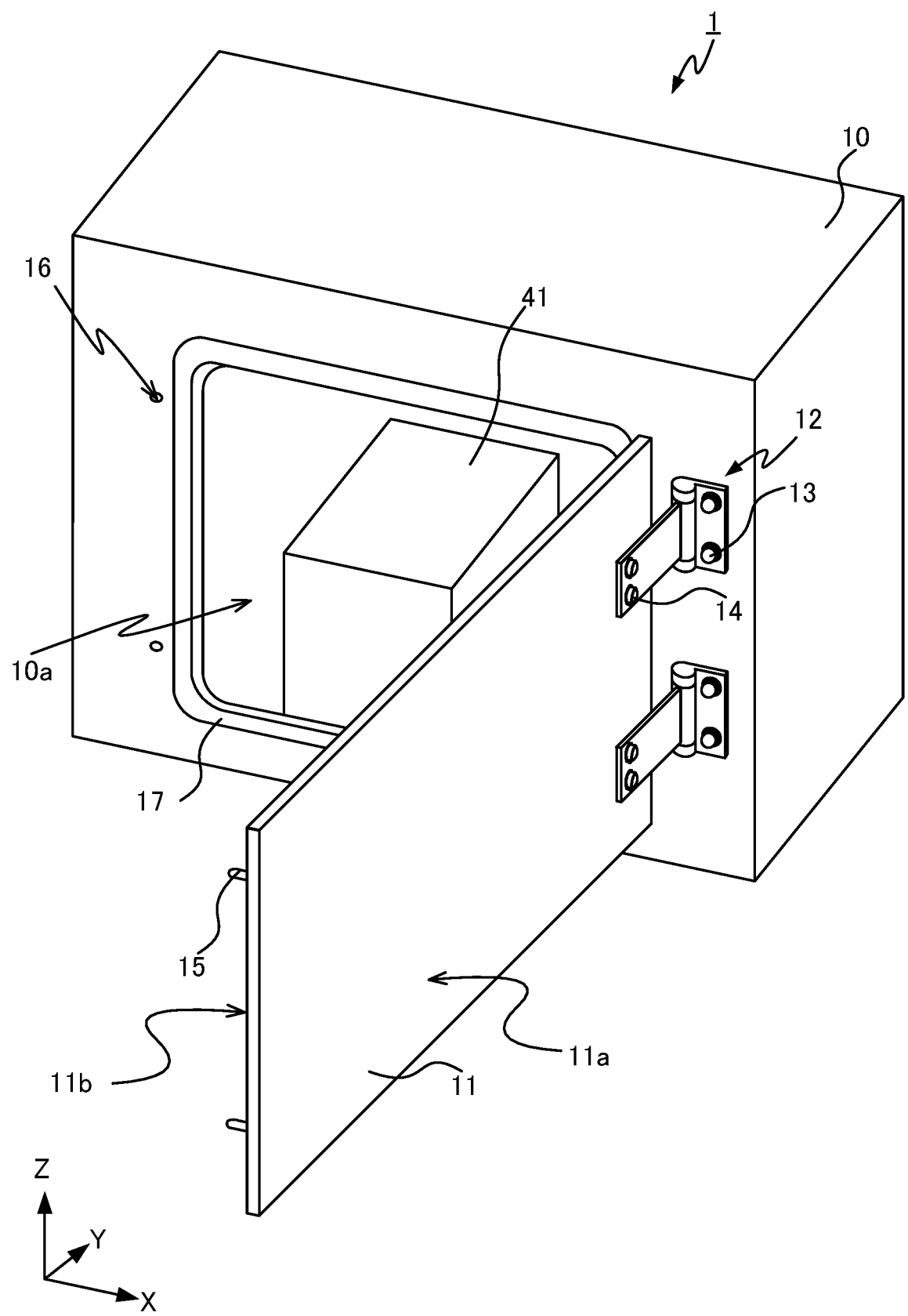
FIG. 2 is a perspective view of the vehicle-mounted device according to Embodiment 1.

A typical example of a vehicle-mounted device installed in a vehicle is a control device for a railway vehicle including a power converter, a circuit breaker, and a transformer, for example. A vehicle-mounted device 1 according to Embodiment 1 is described below focusing on an exemplary control device installed under the floor of a railway vehicle. As illustrated in FIGS. 1 and 2, the vehicle-mounted device 1 includes a housing 10 fixed under the floor of the railway vehicle with fitting members, which are not illustrated, an openable and closable cover 11 covering an opening 10a provided in the housing 10 and the circumference of the opening 10a, and support members 12 and 15 to support the cover 11. In FIGS. 1 and 2, the Z axis indicates the vertical direction, the Y axis indicates the direction in which the opening 10a extends through the housing 10, and the X axis extends in the horizontal direction along the surface provided with the opening 10a of the housing 10. The X, Y, and Z axes are orthogonal to each other.

Figure 3:
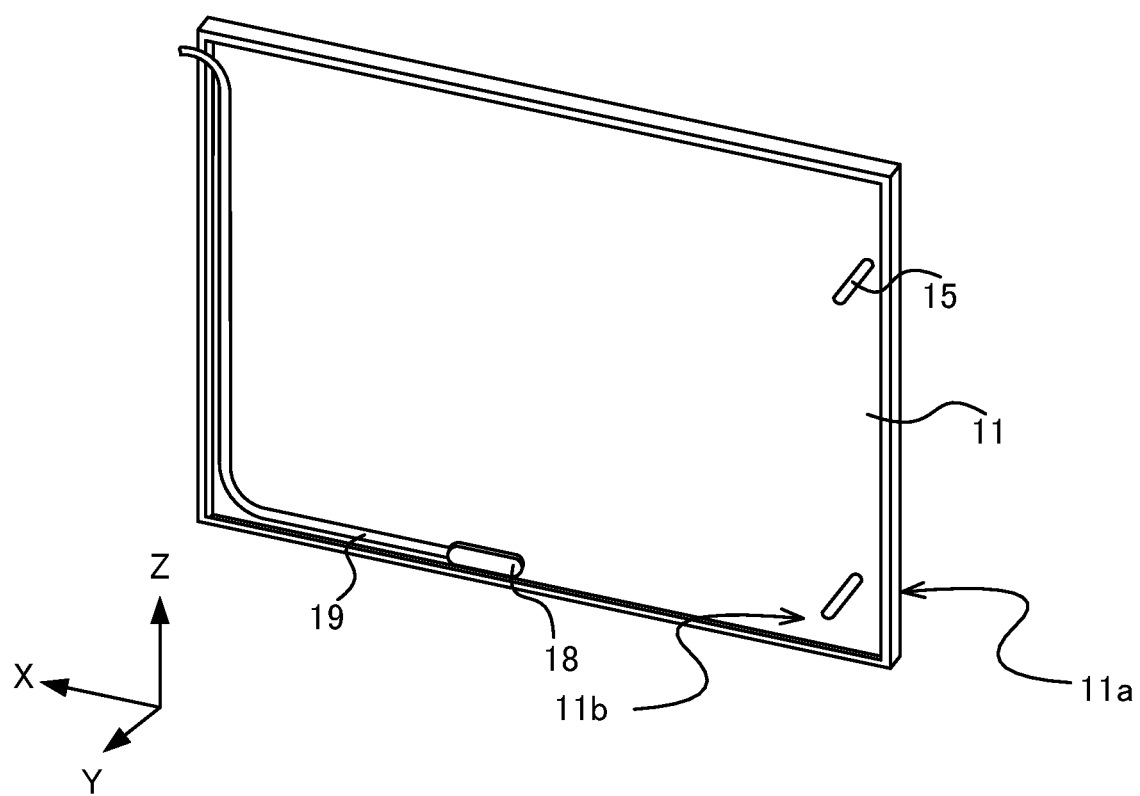
FIG. 3 is a perspective view of a cover according to Embodiment 1.

The vehicle-mounted device 1 further includes a sealing member 17 that surrounds the opening 10a, as illustrated in FIG. 2. The vehicle-mounted device 1 also includes a pressure sensor 18 fixed to an inner surface 11b of the cover 11 at a position such that the pressure sensor 18 is in contact with the sealing member 17 while the cover 11 is closed, as illustrated in FIG. 3. The pressure sensor 18 measures a pressing force received at the sealing member 17 sandwiched between the housing 10 and the cover 11 while the cover 11 is closed.

When the sealing member 17 sandwiched between the housing 10 and the cover 11 receives a sufficiently large pressing force while the cover 11 is closed, the sealing member 17 can prevent the cover 11 and the housing 10 from forming a gap therebetween. This configuration can thus inhibit dust, water drops, and the like, from entering the housing 10 through the opening 10a. Unfortunately, when the resilience of the sealing member 17 decreases due to degradation with age, for example, a reduction occurs in the pressing force received at the sealing member 17 sandwiched between the housing 10 and the cover 11 while the cover 11 is closed, resulting in formation of a gap between the cover 11 and the housing 10. This gap may allow dust, water drops, and the like, to enter the housing 10 through the opening 10a. In order to solve this problem, the vehicle-mounted device 1 according to Embodiment 1 further includes a degradation determination device 30 to determine whether any degradation occurs in the sealing member 17 on the basis of the pressing force measured at the pressure sensor 18 while the cover 11 is closed.

The components of the vehicle-mounted device 1 are described in detail below.

The housing 10 accommodates electronic equipment 41 including a power converter, a circuit breaker, and a transformer, for example. The housing 10 has the opening 10a, as described above, and this opening 10a allows maintenance of the electronic equipment 41 accommodated in the housing 10. On the surface of the housing 10 provided with the opening 10a, the support members 12, which are described below, are fixed with fastening members 13. The surface of the housing 10 provided with the opening 10a has holes 16 to engage with the support members 15, which are described below.

The cover 11 has an outer surface 11a which faces the outside of the housing 10 and on which the support members 12 are fixed with fastening members 14. The cover 11 supported by the support members 12 is rotatable about a rotational axis AX and thus openable and closable, as is described in detail below. In FIG. 1, the rotational axis AX is represented by the dashed-dotted line. The rotational axis AX extends in the Z-axis direction in Embodiment 1.

The support members 12 are each fixed to both of the housing 10 and the outer surface 11a of the cover 11, and have a hinge structure that supports the cover 11 such that the cover 11 is rotatable about the rotational axis AX relative to the housing 10. The sections of the support members 12 fixed to the outer surface 11a are rotatable about the rotational axis AX. This structure enables the cover 11 to rotate about the rotational axis AX, as described above. The vehicle-mounted device 1 includes two support members 12 having the identical structure in Embodiment 1.

The support members 15, which serve to support the cover 11 together with the support members 12, have a protruding shape and are fixed to the inner surface 11b of the cover 11, as illustrated in FIG. 3. A closing operation of the cover 11 as illustrated in FIG. 1 causes the support members 15 to be inserted into the respective holes 16 and engage with the holes 16. The support members 15 thus support the cover 11 while the cover 11 is closed, and can reduce backlash of the cover 11 caused by vibration during running of the vehicle in which the vehicle-mounted device 1 is installed, for example. The vehicle-mounted device 1 includes two support members 15 having the identical structure in Embodiment 1.

Figure 4:
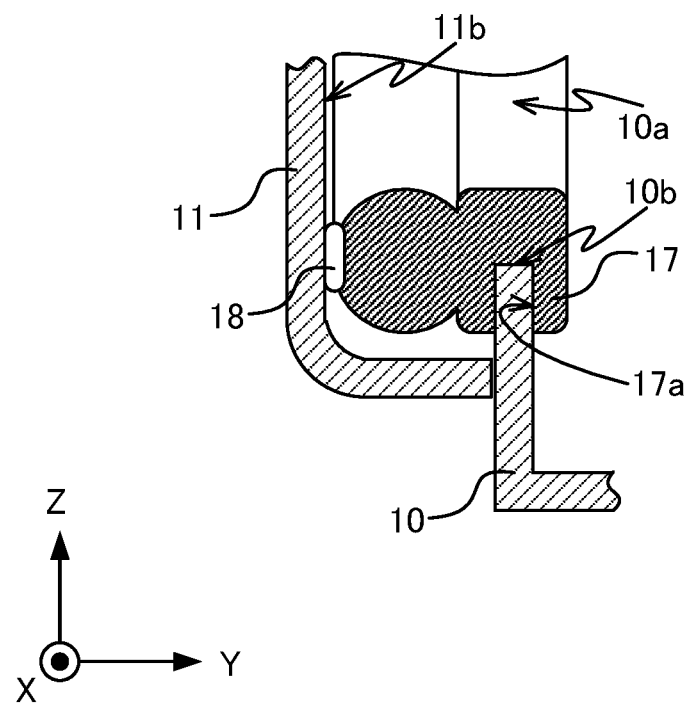
FIG. 4 is a partial sectional view of the vehicle-mounted device according to Embodiment 1.

As illustrated in FIG. 4, which is a partial sectional view taken along the line A-A of FIG. 1, the sealing member 17 has a groove 17a to engage with an edge 10b of the opening 10a. The engagement of the groove 17a with the edge 10b of the opening 10a causes the sealing member 17 to be fixed to the housing 10 while surrounding the opening 10a. While the cover 11 is closed, the sealing member 17 is sandwiched between the housing 10 and the cover 11, as illustrated in FIG. 4.

When being pressed, the pressure sensor 18 outputs a voltage value depending on the pressing force. In other words, the value measured at the pressure sensor 18 is the voltage value depending on the pressing force. The pressure sensor 18 is connected to a cable 19. The pressure sensor 18 is supplied with electric power and transmits the measured value to a degradation determination device 30 via the cable 19. The pressure sensor 18 is preferably supplied with electric power from the electronic equipment 41, such as the power converter, accommodated in the housing 10.

When the sealing member 17 is degraded, the sealing member 17 receives a reduced pressing force from the cover 11 while the cover 11 is closed. This force further decreases as the position becomes more distant from the support members 12 and 15. Accordingly, the pressure sensor 18 is preferably fixed to the housing 10 at the position most distant from the support members 12 and 15 while the cover 11 is closed. In Embodiment 1, the pressure sensor 18 is fixed to the inner surface 11b of the cover 11 at a position such that the pressure sensor 18 is in contact with the center portion of the sealing member 17 in the X-axis direction in the lower part of the opening 10a in the vertical direction.

Figure 5:
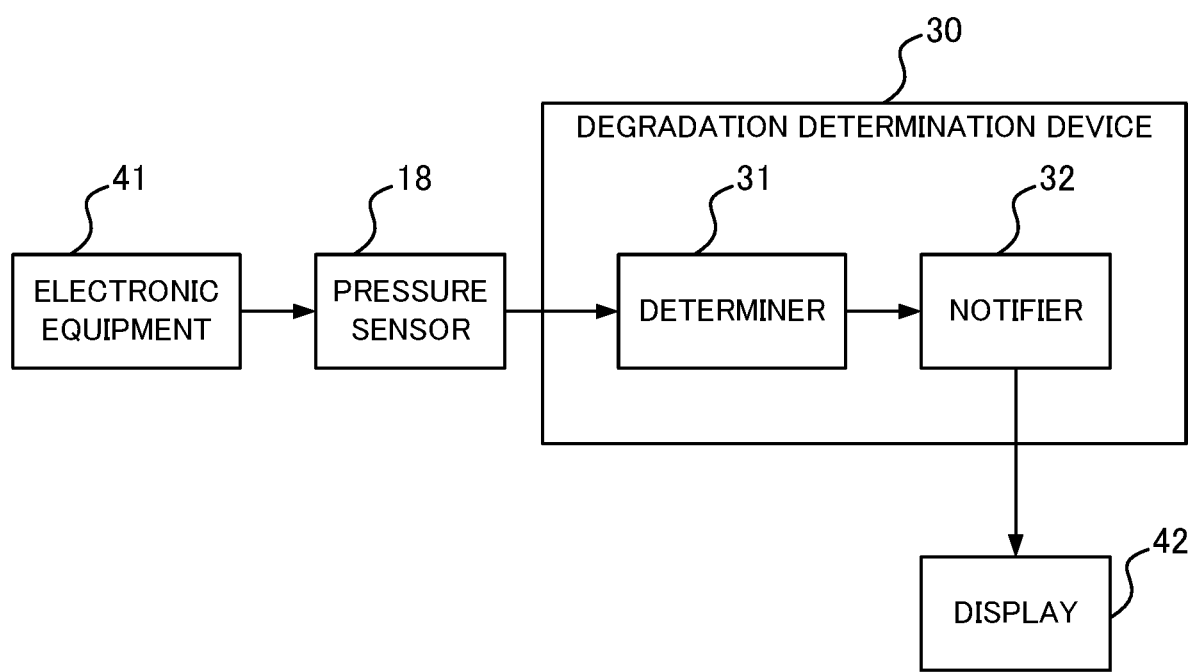
FIG. 5 is a block diagram of the vehicle-mounted device according to Embodiment 1.

The degradation determination device 30 illustrated in FIG. 5 includes a determiner 31 to determine whether any degradation occurs in the sealing member 17 on the basis of the value measured at the pressure sensor 18, and a notifier 32 to output a result of determination at the determiner 31. The degradation determination device 30 is accommodated in the housing 10 in Embodiment 1.

The determiner 31 determines whether the voltage value measured at the pressure sensor 18 is at least a threshold voltage. A voltage value acquired from the pressure sensor 18 of at least the threshold voltage is deemed to mean that the sealing member 17 receives a sufficiently large pressing force from the cover 11, and no degradation occurs in the sealing member 17. In contrast, a voltage value acquired from the pressure sensor 18 lower than the threshold voltage is deemed to mean that a reduction occurs in the pressing force received at the sealing member 17 from the cover 11 due to degradation of the sealing member 17. The threshold voltage is defined on the basis of the voltage value measured at the pressure sensor 18 in the case where the cover 11 is considered to be certainly closed depending on the air tightness necessary for the vehicle-mounted device 1, the material of the sealing member 17, and the materials of the housing 10 and the cover 11, for example.

The notifier 32 outputs a result of determination at the determiner 31 to, for example, an external apparatus including a display 42 provided in the cab of the railway vehicle in which the vehicle-mounted device 1 is installed. In detail, the notifier 32 provides the display 42 with a notification indicating whether any degradation occurs in the sealing member 17 and causes the display 42 to display the result.

Figure 6:
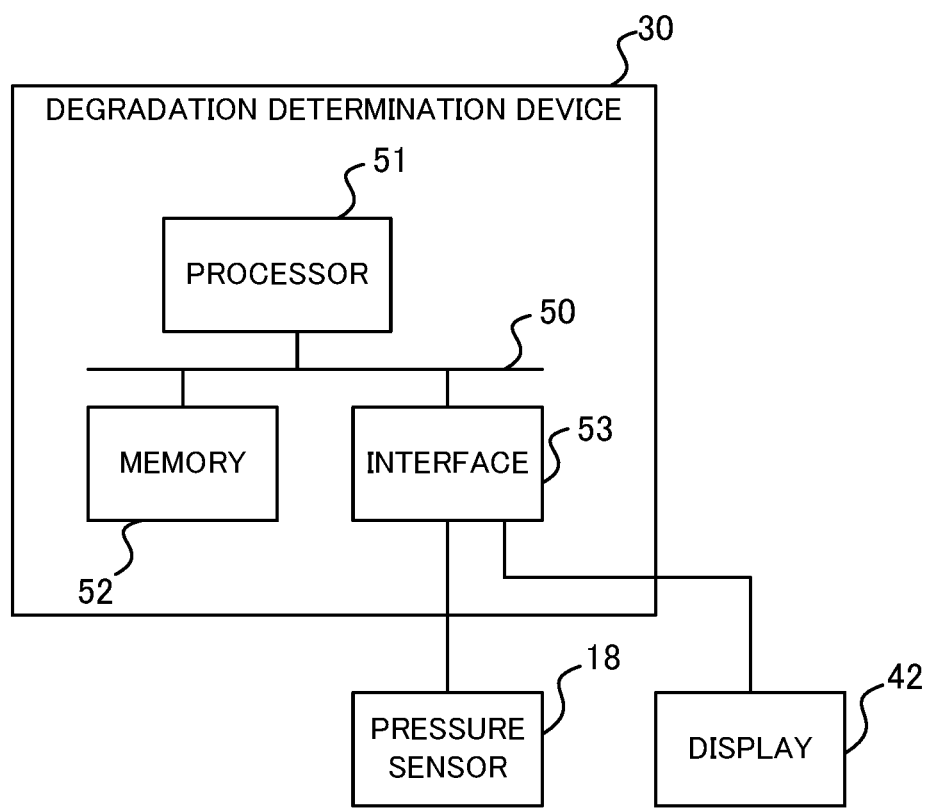
FIG. 6 illustrates an exemplary hardware configuration of the vehicle-mounted device according to Embodiment 1.

As illustrated in FIG. 6, the degradation determination device 30 is achieved by a processor 51, a memory 52, and an interface 53. The processor 51, the memory 52, and the interface 53 are connected to each other via buses 50. The processor 51 is connected to both of the pressure sensor 18 and the display 42 via the buses 50 and the interface 53. A process of determining degradation executed at the degradation determination device 30 is performed by execution of a program stored in the memory 52 at the processor 51. The interface 53 serves to connect the degradation determination device 30 to both of the pressure sensor 18 and the display 42 and establish communication. The interface 53 may include multiple types of interfaces, as required. Although FIG. 6 illustrates an example in which the degradation determination device 30 includes a single processor 51 and a single memory 52, the degradation determination device 30 may also include multiple processors 51 and multiple memories 52.

An operation of the degradation determination device 30 is described below with reference to FIG. 7, focusing on an example in which the degradation determination device 30 operates on the electric power supplied from the electronic equipment 41 and repeats the process of determining degradation during operation. In this case, an interlock mechanism is preferably provided, for example, so that the electronic equipment 41 accommodated in the housing 10 is electrically connected to the power source only when the cover 11 is closed.

Figure 7:
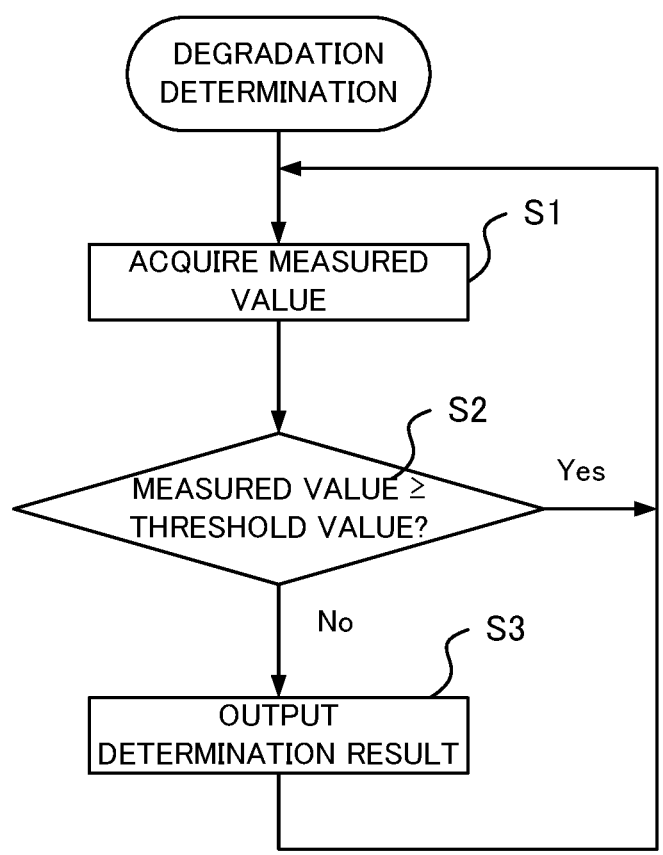
FIG. 7 is a flowchart illustrating an exemplary operation of determining degradation executed in the vehicle-mounted device according to Embodiment 1.

As illustrated in FIG. 7, the determiner 31 acquires a measured value from the pressure sensor 18 (Step S1). The determiner 31 then determines whether the voltage value measured at and output from the pressure sensor 18 is at least the threshold voltage (Step S2). When the determiner 31 determines that the voltage value acquired from the pressure sensor 18 is at least the threshold voltage (Step S2; Yes), the above-described steps are repeated from Step S1.

In contrast, when the determiner 31 determines that the voltage value acquired from the pressure sensor 18 is lower than the threshold voltage (Step S2; No), the notifier 32 outputs a result of determination at the determiner 31 to any external apparatus (Step S3). After Step S3, the above-described steps are repeated from Step S1.

As described above, the vehicle-mounted device 1 according to Embodiment 1 includes the pressure sensor 18 fixed to the cover 11 at a position such that the pressure sensor 18 is in contact with the sealing member 17 while the cover 11 is closed. The pressure sensor 18 outputs a voltage value depending on the pressing force received at the sealing member 17 sandwiched between the housing 10 and the cover 11 while the cover 11 is closed. The degradation determination device 30 then determines whether the voltage value is at least the threshold voltage and outputs a determination result. A voltage value of at least the threshold voltage is deemed to mean that the sealing member 17 sandwiched between the housing 10 and the cover 11 receives a sufficiently large pressing force, and no degradation occurs in the sealing member 17. In contrast, a voltage value lower than the threshold voltage is deemed to mean that the sealing member 17 sandwiched between the housing 10 and the cover 11 receives a small pressing force, and any degradation occurs in the sealing member 17. The vehicle-mounted device 1 can thus determine degradation of the sealing member 17 on the basis of the value measured at the pressure sensor 18. The vehicle-mounted device 1 can therefore maintain the waterproofness and dust resistance. In detail, the determination of degradation of the sealing member 17 can lead to facilitation of a maintenance operation including replacement of the sealing member 17 in the case of degradation of the sealing member 17, and prevention of the degraded sealing member 17 from allowing dust, water drops, and the like, to enter the vehicle-mounted device 1.

Since the threshold voltage is defined as a voltage value that can achieve the air tightness necessary for the housing 10 of the vehicle-mounted device 1, degradation of the sealing member 17 can be determined at the stage before the housing 10 loses the required air tightness. This configuration can thus facilitate a maintenance operation including replacement of the sealing member 17 before the housing 10 loses the required air tightness.

Embodiment 2

The sealing member 17 may also be fixed to the cover 11. Embodiment 2 is directed to a vehicle-mounted device 2 including a sealing member 21 fixed to the cover 11.

Figure 8:
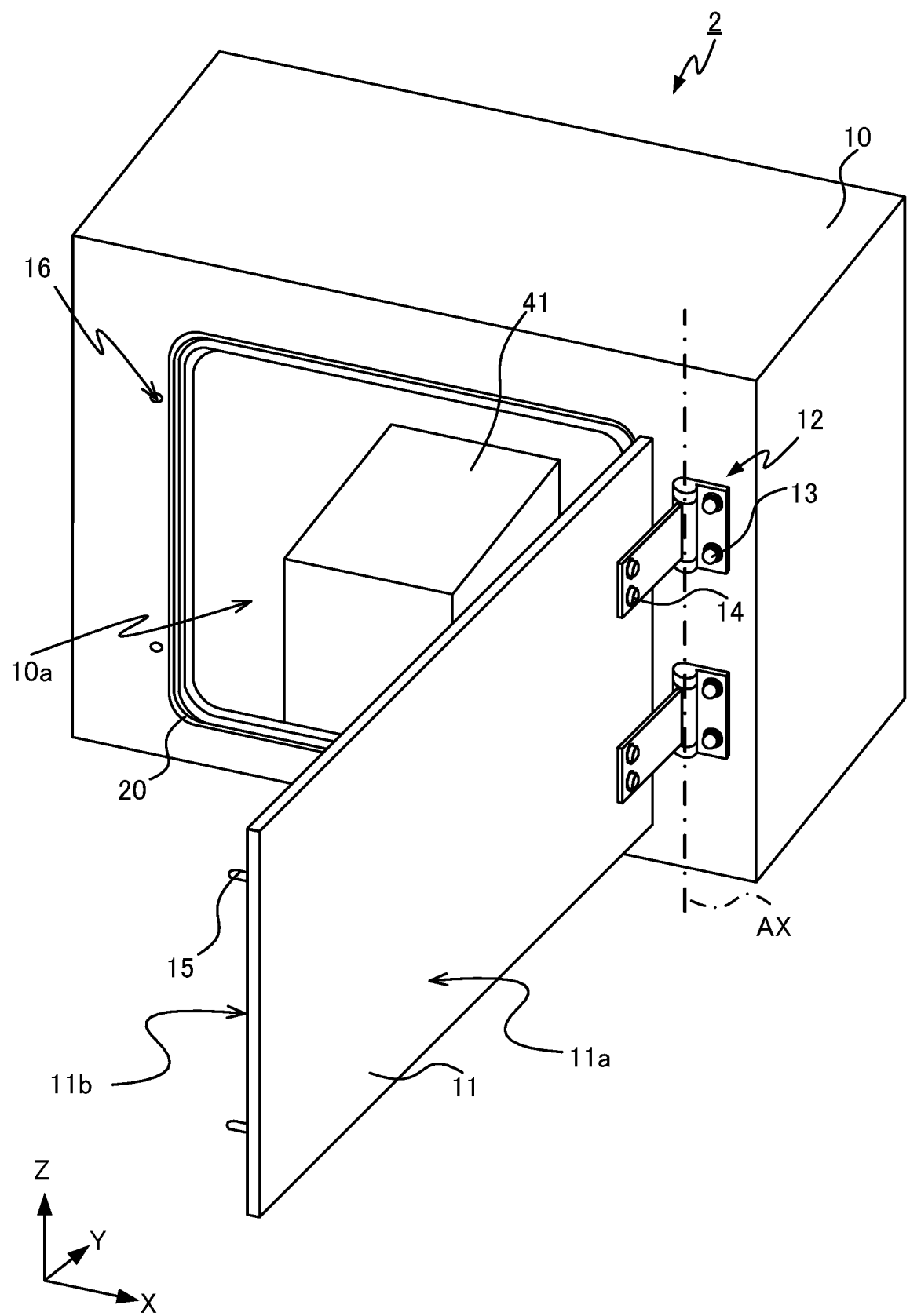
FIG. 8 is a perspective view of a vehicle-mounted device according to Embodiment 2 of the present disclosure.
Figure 9:
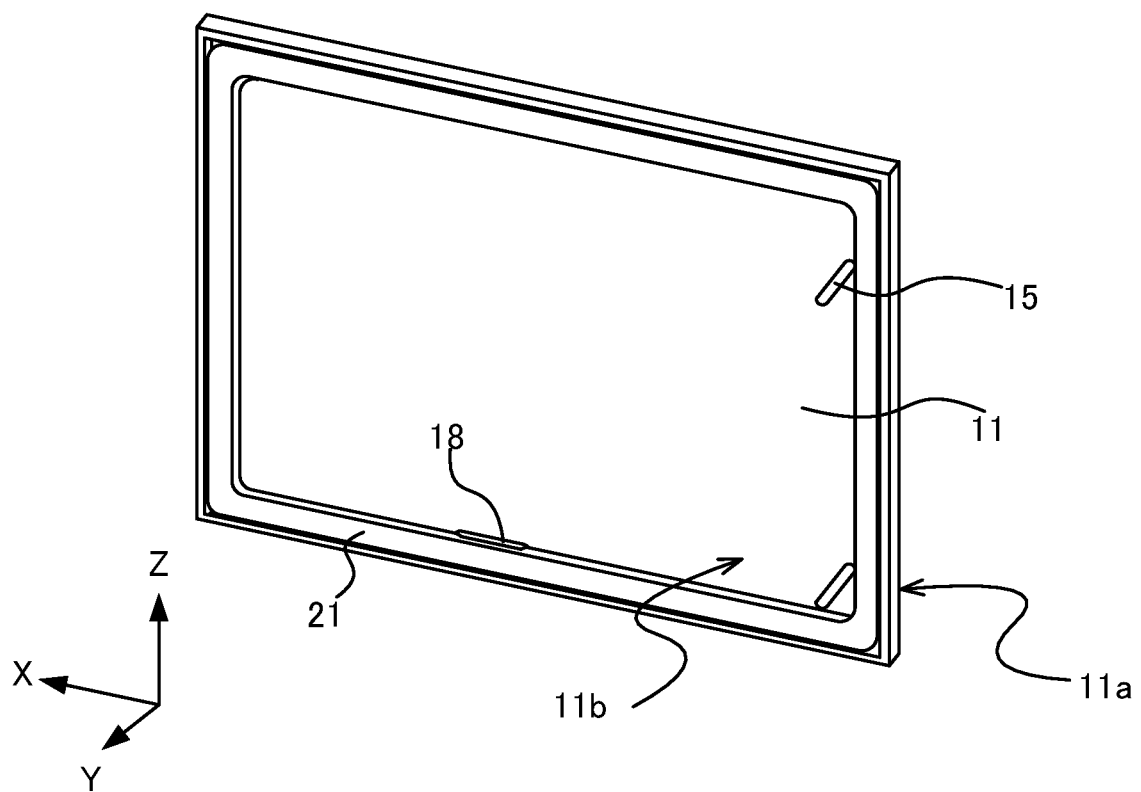
FIG. 9 is a perspective view of a cover according to Embodiment 2.

The vehicle-mounted device 2 illustrated in FIG. 8 differs from the vehicle-mounted device 1 according to Embodiment 1, in that the vehicle-mounted device 2 includes a first protruding member 20 that surrounds the opening 10a of the housing 10 and extends toward the outside of the housing 10, and the sealing member 21 fixed to the inner surface 11b of the cover 11 at a position such that the sealing member 21 is in contact with the first protruding member 20 while the cover 11 is closed, as illustrated in FIG. 9.

Figure 10:
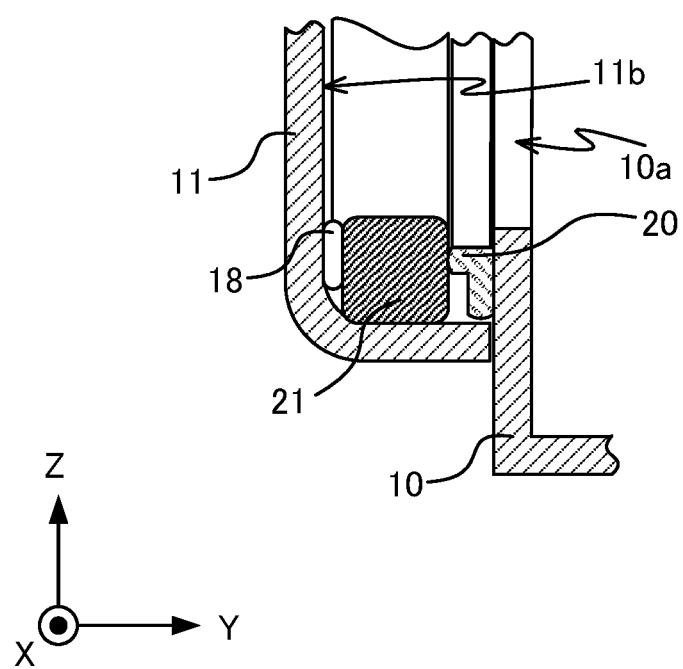
FIG. 10 is a partial sectional view of the vehicle-mounted device according to Embodiment 2.

As illustrated in FIGS. 8 and 10, the first protruding member 20 is made of a member having a shape of bent plate. The first protruding member 20 is fixed around the opening 10a of the housing 10 with fastening members, which are not illustrated, and extends in the direction apart from the housing 10, that is, toward the negative side in the Y-axis direction.

As illustrated in FIG. 9, the sealing member 21 is fixed to the inner surface 11b of the cover 11 with an adhesive, for example. The sealing member 21 is fixed to the inner surface 11b of the cover 11 at a position such that the sealing member 21 is in contact with the first protruding member 20 while the cover 11 is closed, as illustrated in FIG. 10.

In the vehicle-mounted device 2, the pressure sensor 18 is fixed to at least one of the inner surface 11b or the sealing member 21 at a position such that the pressure sensor 18 faces a part of the first protruding member 20 with the sealing member 21 arranged therebetween while the cover 11 is closed. The pressure sensor 18 measures a pressing force received at the sealing member 21 sandwiched between the housing 10 and the cover 11, as in Embodiment 1. In detail, the pressure sensor 18 measures a pressing force applied to the sealing member 21 sandwiched between the first protruding member 20 fixed to the housing 10 and the cover 11.

As in Embodiment 1, when the sealing member 21 is degraded, the sealing member 21 sandwiched between the housing 10 and the cover 11 receives a reduced pressing force while the cover 11 is closed. This force further decreases as the position becomes more distant from the support members 12 and 15. Accordingly, the pressure sensor 18 is preferably fixed to at least one of the cover 11 or the sealing member 21 at the position most distant from the support members 12 and 15 while the cover 11 is closed. In Embodiment 2, the pressure sensor 18 is fixed to at least one of the inner surface 11b of the cover 11 or the sealing member 21 at a position such that the pressure sensor 18 is in contact with the center portion of the sealing member 21 in the X-axis direction in the lower portion of the cover 11 in the vertical direction.

The degradation determination device 30 according to Embodiment 2 has the structure and operation identical to those in Embodiment 1. The degradation determination device 30 according to Embodiment 2 can determine whether any degradation occurs in the sealing member 21 on the basis of the value measured at the pressure sensor 18.

As described above, the vehicle-mounted device 2 according to Embodiment 2 includes the pressure sensor 18 fixed to at least one of the cover 11 or the sealing member 21 at a position such that the pressure sensor 18 faces the first protruding member 20 fixed to the housing 10 with the sealing member 21 arranged therebetween while the cover 11 is closed. The pressure sensor 18 outputs a voltage value depending on the pressing force received at the sealing member 21 sandwiched between the housing 10 and the cover 11. The degradation determination device 30 then determines whether the voltage value is at least the threshold voltage and outputs a determination result. A voltage value of at least the threshold voltage is deemed to mean that the sealing member 21 sandwiched between the housing 10 and the cover 11 receives a sufficiently large pressing force, and no degradation occurs in the sealing member 21. In contrast, a voltage value lower than the threshold voltage is deemed to mean that the sealing member 21 sandwiched between the housing 10 and the cover 11 receives a small pressing force, and any degradation occurs in the sealing member 21. The vehicle-mounted device 2 can thus determine degradation of the sealing member 21 on the basis of the value measured at the pressure sensor 18. The vehicle-mounted device 2 can therefore maintain the waterproofness and dust resistance.

Embodiment 3

The pressure sensor 18 may also be fixed to the housing 10. Embodiment 3 is directed to a vehicle-mounted device 3 including the pressure sensor 18 fixed to the housing 10.

Figure 11:
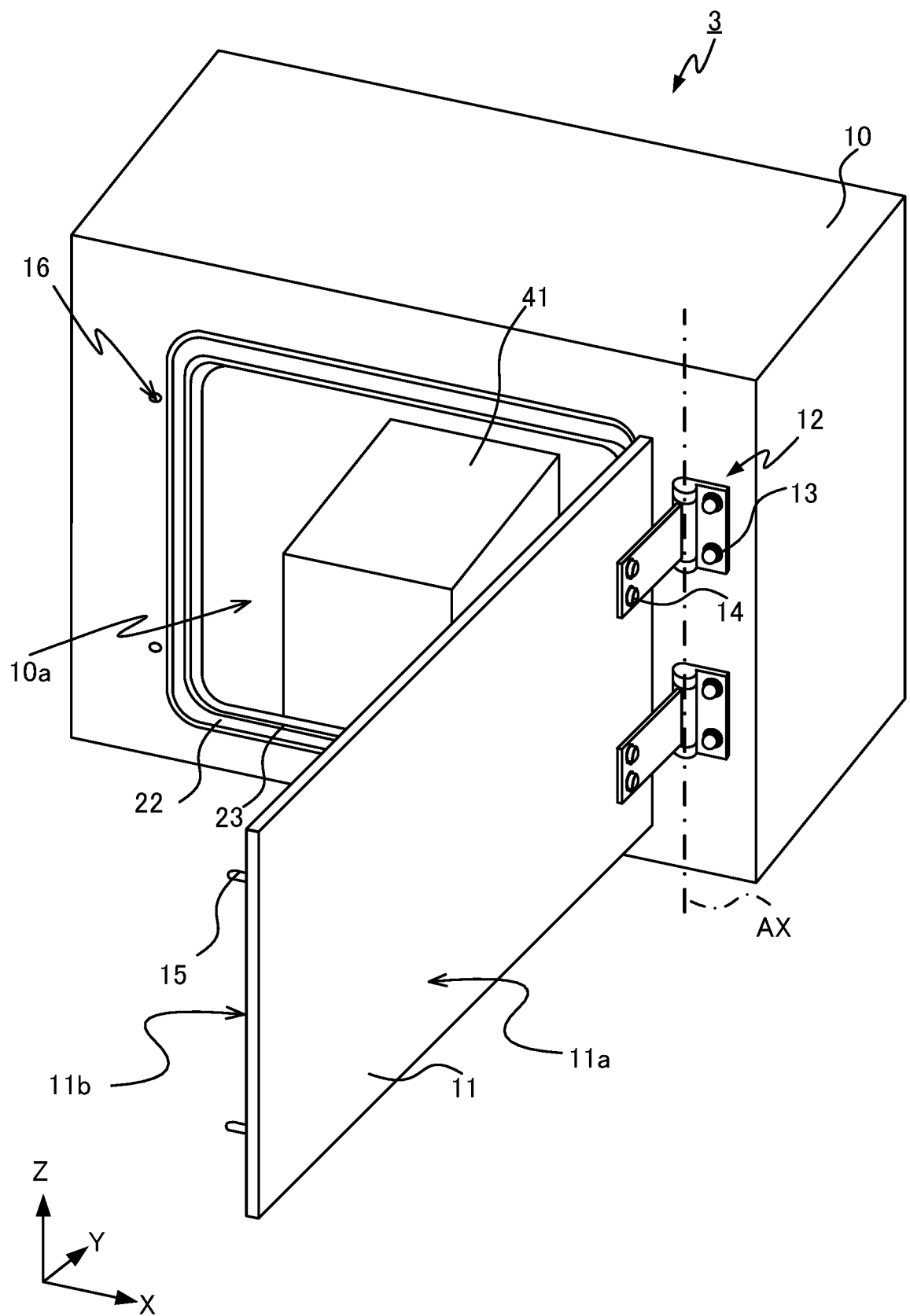
FIG. 11 is a perspective view of a vehicle-mounted device according to Embodiment 3 of the present disclosure.
Figure 12:
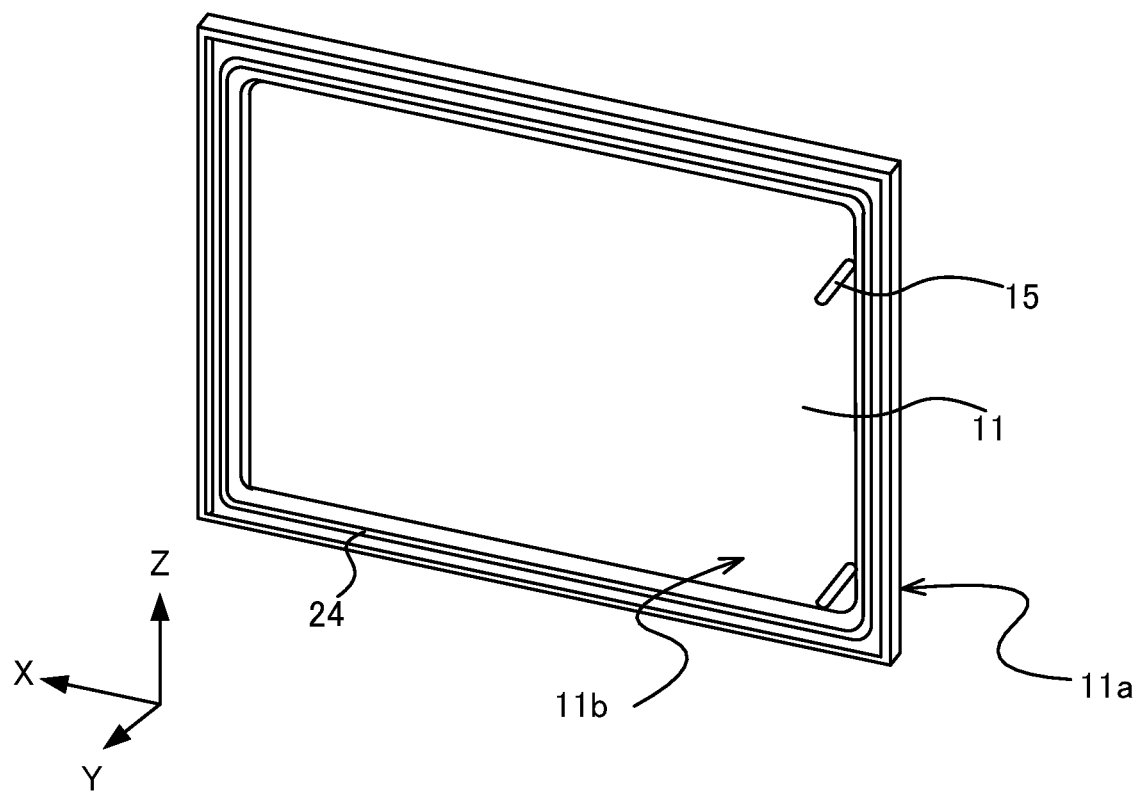
FIG. 12 is a perspective view of a cover according to Embodiment 3.

The vehicle-mounted device 3 illustrated in FIG. 11 differs from the vehicle-mounted device 1 according to Embodiment 1, in that the vehicle-mounted device 3 includes a sealing member 22 held by a retainer 23 provided to the housing 10, and a second protruding member 24 fixed to the inner surface 11b of the cover 11 at a position such that the second protruding member 24 is in contact with the sealing member 22 while the cover 11 is closed, as illustrated in FIG. 12.

As illustrated in FIG. 11, the sealing member 22 is held by the retainer 23 provided around the opening 10a of the housing 10 and is fixed to the housing 10.

Figure 13:
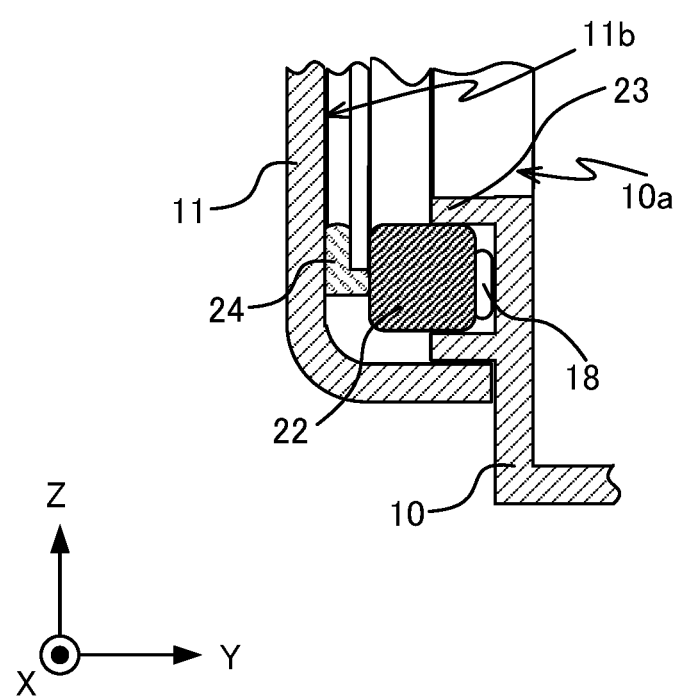
FIG. 13 is a partial sectional view of the vehicle-mounted device according to Embodiment 3.

As illustrated in FIG. 13, the retainer 23 extends in the direction apart from the housing 10 and holds the sealing member 22 therein. In detail, the retainer 23 surrounds the opening 10a and is made of two plate segments spaced from each other.

The second protruding member 24 is made of a member having a shape of bent plate, as illustrated in FIGS. 12 and 13. The second protruding member 24 is fixed to the inner surface 11b of the cover 11 with fastening members, which are not illustrated, and extends in the direction apart from the inner surface 11b.

In the vehicle-mounted device 3, the pressure sensor 18 is fixed to at least one of the housing 10 or the sealing member 22 at a position such that the pressure sensor 18 faces a part of the second protruding member 24 with the sealing member 22 arranged therebetween while the cover 11 is closed. In detail, the pressure sensor 18 is fixed to at least one of the housing 10 or the sealing member 22 at a position such that the pressure sensor 18 is held by the retainer 23. The pressure sensor 18 measures a pressing force received at the sealing member 22 sandwiched between the housing 10 and the cover 11, as in Embodiments 1 and 2. In detail, the pressure sensor 18 measures a pressing force applied to the sealing member 22 sandwiched between the housing 10 and the second protruding member 24 fixed to the cover 11.

As in Embodiments 1 and 2, when the sealing member 22 is degraded, the sealing member 22 sandwiched between the housing 10 and the cover 11 receives a reduced pressing force while the cover 11 is closed. This force further decreases as the position becomes more distant from the support members 12 and 15. Accordingly, the pressure sensor 18 is preferably fixed to at least one of the housing 10 or the sealing member 22 at the position most distant from the support members 12 and 15 while the cover 11 is closed. In Embodiment 3, the pressure sensor 18 is fixed to at least one of the housing 10 or the sealing member 22 at a position such that the pressure sensor 18 is in contact with the center portion of the sealing member 22 in the X-axis direction in the lower portion of the opening 10a in the vertical direction.

The degradation determination device 30 according to Embodiment 3 has the structure and operation identical to those in Embodiment 1. The degradation determination device 30 according to Embodiment 3 can determine whether any deterioration occurs in the sealing member 22 on the basis of the value measured at the pressure sensor 18.

As described above, the vehicle-mounted device 3 according to Embodiment 3 includes the pressure sensor 18 fixed to at least one of the housing 10 or the sealing member 22 at a position such that the pressure sensor 18 faces the second protruding member 24 fixed to the cover 11 with the sealing member 22 arranged therebetween while the cover 11 is closed. The pressure sensor 18 outputs a voltage value depending on the pressing force received at the sealing member 22 sandwiched between the housing 10 and the cover 11. The degradation determination device 30 then determines whether the voltage value is at least the threshold voltage and outputs a determination result. A voltage value of at least the threshold voltage is deemed to mean that the sealing member 22 sandwiched between the housing 10 and the cover 11 receives a sufficiently large pressing force, and no degradation occurs in the sealing member 22. In contrast, a voltage value lower than the threshold voltage is deemed to mean that the sealing member 22 sandwiched between the housing 10 and the cover 11 receives a small pressing force, and any degradation occurs in the sealing member 22. The vehicle-mounted device 3 can thus determine degradation of the sealing member 22 on the basis of the value measured at the pressure sensor 18. The vehicle-mounted device 3 can therefore maintain the waterproofness and dust resistance.

The above-described embodiments of the present disclosure are not intended to limit the scope of the present disclosure. The above-described hardware configurations and flowchart are mere examples and may be arbitrarily varied and modified.

The operation of the degradation determination device 30 in the above-described embodiments is a mere example. In the case where any of the vehicle-mounted devices 1 to 3 is installed in a railway vehicle, the pressing force applied to the pressure sensor 18 fluctuates, for example, while the railway vehicle is running through a tunnel or passing by another railway vehicle. In order to inhibit this fluctuation from leading to an error in determination of deterioration of the sealing member 17, 21, or 22, the degradation determination device 30 included in any of the vehicle-mounted devices 1 to 3 may determine whether the period during which the value measured at the pressure sensor 18 has been lower than the threshold value is equal to or longer than a predetermined period. The predetermined period is a period long enough not to mistake the above-described fluctuation of the pressing force for degradation of the sealing member 17, 21, or 22. For example, the predetermined period has a duration of approximately several tens of seconds.

Figure 14:
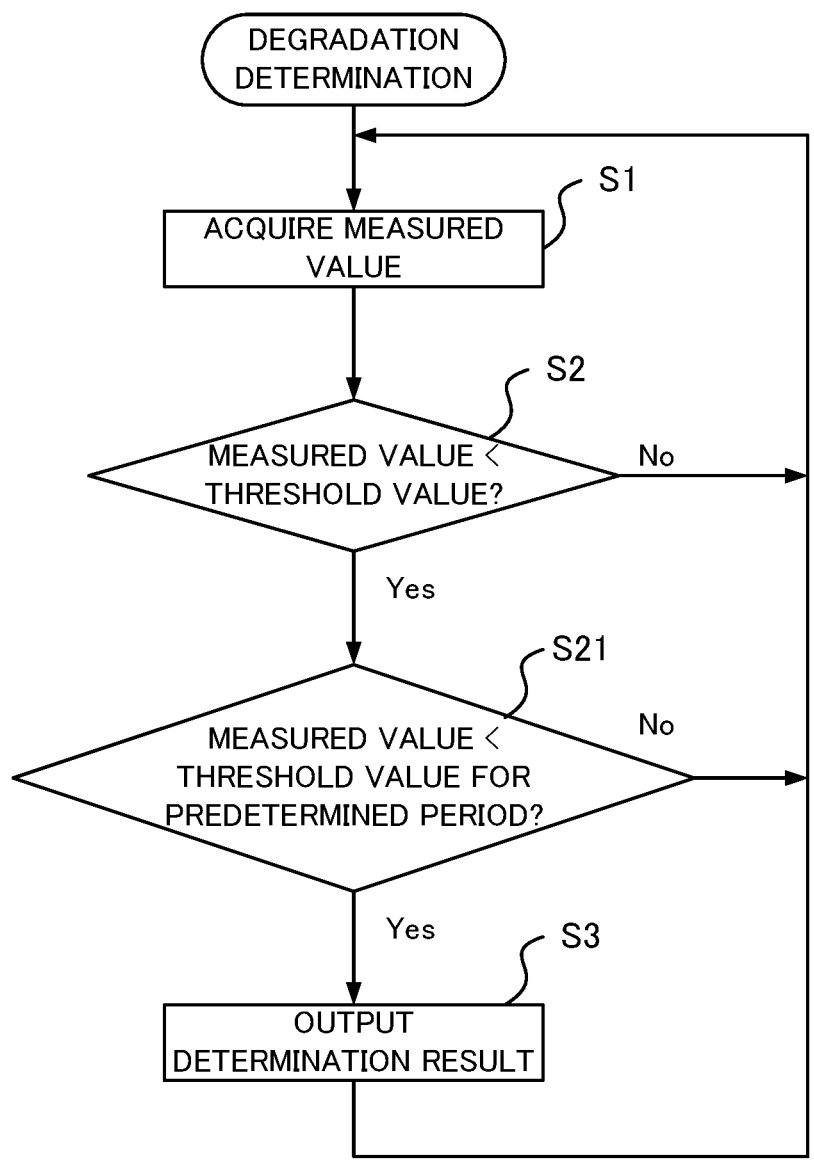
FIG. 14 is a flowchart illustrating a modification of an exemplary operation of determining degradation executed in the vehicle-mounted device according to the embodiments.

A modification of the operation of the degradation determination device 30 designed so as not to mistake the fluctuation of the pressing force for degradation of the sealing member 17, 21, or 22, as described above, is described below with reference to FIG. 14. Steps S1 and S2 in FIG. 14 correspond to Steps S1 and S2 in FIG. 7.

When the determiner 31 determines that the voltage value acquired from the pressure sensor 18 is lower than the threshold voltage (Step S2; Yes), the notifier 32 determines whether the period during which the determiner 31 has been determining the voltage value to be lower than the threshold voltage is equal to or longer than the predetermined period (Step S21). In detail, the notifier 32 acquires a determination result from the determiner 31, and causes the result to be stored into a memory, which is not illustrated, in association with a time acquired from a timer. On the basis of the determination results that have been stored into the memory for the latest predetermined period, the notifier 32 determines whether the period during which the determiner 31 has been determining the voltage value to be lower than the threshold voltage is equal to or longer than the predetermined period. The predetermined period is a period long enough not to mistake the fluctuation of the pressing force for degradation of the sealing member 17, 21, or 22, as described above.

When the notifier 32 determines that the period during which the determiner 31 has been determining the voltage value to be lower than the threshold voltage is shorter than the predetermined period (Step S21; No), the above-described steps are repeated from Step S1. When the period during which the determiner 31 has been determining the voltage value to be lower than the threshold voltage is shorter than the predetermined period, this situation is deemed to mean that the fluctuation of the value measured at the pressure sensor 18 is just a temporary variation, and no degradation occurs in the sealing member 17, 21, or 22. In detail, when at least one of the determination results that have been stored into the memory for the latest predetermined period indicates a voltage value of at least the threshold voltage, the period during which the determiner 31 has been determining the voltage value to be lower than the threshold voltage is considered to be shorter than the predetermined period.

In contrast, when the notifier 32 determines that the period during which the determiner 31 has been determining the voltage value to be lower than the threshold voltage is equal to or longer than the predetermined period (Step S21; Yes), the notifier 32 outputs a result of determination at the determiner 31 to the display 42 (Step S3). In detail, when all the determination results that have been stored into the memory for the latest predetermined period indicate voltage values lower than the threshold voltage, the period during which the determiner 31 has been determining the voltage value to be lower than the threshold voltage is considered to be equal to or longer than the predetermined period. Step S3 corresponds to Step S3 in FIG. 7.

As described above, the degradation determination device 30 provides a notification indicating occurrence of degradation of the sealing member 17, 21, or 22 when the period during which the value measured at the pressure sensor 18 has been lower than the threshold voltage is equal to or longer than the predetermined period. This configuration can improve the accuracy of determination of degradation of the sealing member 17, 21, or 22.

Any of the vehicle-mounted devices 1 to 3 may include multiple pressure sensors 18 disposed at mutually different positions. In this case, the determiner 31 may determine whether each of the voltage values measured at the individual pressure sensors 18 is at least a threshold voltage. The voltage values measured at the pressure sensors 18 may be compared with the same threshold voltage or mutually different threshold voltages. In the case of different threshold voltages for the individual pressure sensors 18, these threshold voltages may be defined depending on the positions of the individual pressure sensors 18, for example. In detail, the threshold voltages for the individual pressure sensors 18 may be defined depending on the distances from the support members 12 and 15 to the individual pressure sensors 18. When the determiner 31 determines that a voltage value measured at at least one of the multiple pressure sensors 18 is lower than the threshold voltage, the notifier 32 may output a result of determination at the determiner 31 to the display 42.

The numbers and positions of the support members 12 and 15 included in any of the vehicle-mounted devices 1 to 3 may be arbitrarily defined depending on the properties, such as material and weight, of the cover 11. For example, the support members 12 may be fixed to both of the housing 10 and the cover 11 such that the rotational axis AX extends in the X-axis direction. In this case, parts of the support members 12 may be fixed to the upper portion of the opening 10a in the Z-axis direction, while the other parts of the support members 12 may be fixed to the outer surface 11a of the cover 11.

The opening 10a may also be provided in the upper or lower surface of the housing 10 in the vertical direction, as well as the side surface of the housing 10.

The support members 12 may also be fixed by any means, as well as being fixed with the fastening members 13 and 14. For example, the support members 12 may be fixed to both of the housing 10 and the cover 11 with an adhesive or by welding.

The support members 12 may also have any structure for supporting the cover 11 such that the cover 11 is rotatable about the rotational axis AX, as well as the hinge structure.

The support members 15 may also have any shape provided that the support members 15 can support the cover 11 while the cover 11 is closed and reduce backlash of the cover 11 caused by vibration during running of the vehicle in which any of the vehicle-mounted devices 1 to 3 is installed, as well as the shape of protrusion provided on the inner surface 11b of the cover 11. For example, the support members 15 may also be protrusions provided on the housing 10. In this case, the cover 11 may be provided with members to engage with the support members 15.

The support members 15 may be fabricated separately from the cover 11, fixed to the cover 11, or integrated with the cover 11.

The pressure sensor 18 may be supplied with electric power from the electronic equipment accommodated in the housing 10 as in Embodiments 1 to 3 described above, or may include an internal power source.

The first protruding member 20 may also be fixed to the housing 10 by any means, and the second protruding member 24 may also be fixed to the cover 11 by any means, as well as being fixed with the fastening members. For example, the first protruding member 20 may be fixed to the housing 10 and the second protruding member 24 may be fixed to the cover 11 with an adhesive or by welding. The first protruding member 20 may also be integrated with the cover 11. The second protruding member 24 may also be integrated with the housing 10.

The degradation determination device 30 may be provided outside the housing 10. In this case, the degradation determination device 30 may determine whether the vehicle is running on the basis of information from an activation switch or a control system for the vehicle, for example, and then determine whether the voltage value acquired from the pressure sensor 18 is at least the threshold voltage during running of the vehicle.

The degradation determination device 30 is not required to be provided in the vehicle in which any of the vehicle-mounted devices 1 to 3 is installed. In this case, the degradation determination device 30 may acquire a value measured at the pressure sensor 18 via a network inside the vehicle and a network for connecting devices inside the vehicle to devices outside the vehicle. The degradation determination device 30 may also be achieved in the form of a function of the control system for the vehicle.

The vehicle-mounted devices 1 to 3 may also be installed in other vehicles, such as automobiles, marine vessels, and aircrafts, as well as railway vehicles. The vehicle-mounted devices 1 to 3 may also be provided at any site, such as on the floor or on the roof, as well as under the floor.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST 1, 2, 3 Vehicle-mounted device
10 Housing
10a Opening
10b Edge
11 Cover
11a Outer surface
11b Inner surface
12, 15 Support member
13, 14 Fastening member
16 Hole
17, 21, 22 Sealing member
17a Groove
18 Pressure sensor
19 Cable
20 First protruding member
23 Retainer
24 Second protruding member
30 Degradation determination device
31 Determiner
32 Notifier
41 Electronic equipment
42 Display
50 Bus
51 Processor
52 Memory
53 Interface
AX Rotational axis

The invention claimed is:

1. A vehicle-mounted device, comprising:
a housing having an opening;
a cover covering the opening, the cover being openable and closable;
a sealing member fixed to the housing or the cover, the sealing member being sandwiched between the housing and the cover while surrounding the opening when the cover is closed;
at least one pressure sensor fixed to at least one of the cover, the housing, or the sealing member at a position such that the at least one pressure sensor is in contact with the sealing member while the cover is closed, the at least one pressure sensor being configured to measure a pressing force received at the sealing member sandwiched between the housing and the cover while the cover is closed;
a degradation determination device to determine whether any degradation occurs in the sealing member based on the pressing force measured at the at least one pressure sensor while the cover is closed; and
a support member to support the cover, wherein
at least one of the at least one pressure sensor is fixed to at least one of the cover, the housing, or the sealing member at a position between the cover or the housing and the sealing member while the cover is closed, the position being most distant from the support member while the cover is closed.

2. The vehicle-mounted device according to claim 1, wherein
the sealing member has a groove to engage with an edge of the opening, the sealing member being fixed around the opening by engagement of the groove with the edge of the opening, and
the at least one pressure sensor is fixed to an inner surface of the cover at a position such that the at least one pressure sensor is in contact with the sealing member while the cover is closed.

3. The vehicle-mounted device according to claim 2, wherein
the at least one pressure sensor outputs a voltage value depending on the pressing force, and
the degradation determination device comprises:
a determiner to determine whether the voltage value output from the at least one pressure sensor is lower than a threshold voltage; and
a notifier to provide a notification indicating occurrence of degradation of the sealing member when the determiner determines the voltage value to be lower than the threshold voltage.

4. The vehicle-mounted device according to claim 3, wherein the notifier provides the notification indicating occurrence of degradation of the sealing member when a period during which the determiner has been determining the voltage value to be lower than the threshold voltage is equal to or longer than a predetermined period.

5. The vehicle-mounted device according to claim 1, wherein
the sealing member is fixed to an inner surface of the cover, and
the at least one pressure sensor is fixed to at least one of the inner surface of the cover or the sealing member at a position such that the at least one pressure sensor is sandwiched between the cover and the sealing member.

6. The vehicle-mounted device according to claim 5, further comprising:
a first protruding member fixed around the opening, surrounding the opening, and extending toward an outside of the housing, wherein
the sealing member is in contact with the first protruding member while the cover is closed, and
the at least one pressure sensor is fixed to at least one of the inner surface of the cover or the sealing member at a position such that the at least one pressure sensor faces a part of the first protruding member with the sealing member arranged therebetween while the cover is closed.

7. The vehicle-mounted device according to claim 6, wherein
the at least one pressure sensor outputs a voltage value depending on the pressing force, and
the degradation determination device comprises:
a determiner to determine whether the voltage value output from the at least one pressure sensor is lower than a threshold voltage; and
a notifier to provide a notification indicating occurrence of degradation of the sealing member when the determiner determines the voltage value to be lower than the threshold voltage.

8. The vehicle-mounted device according to claim 7, wherein the notifier provides the notification indicating occurrence of degradation of the sealing member when a period during which the determiner has been determining the voltage value to be lower than the threshold voltage is equal to or longer than a predetermined period.

9. The vehicle-mounted device according to claim 5, wherein
the at least one pressure sensor outputs a voltage value depending on the pressing force, and
the degradation determination device comprises:
a determiner to determine whether the voltage value output from the at least one pressure sensor is lower than a threshold voltage; and
a notifier to provide a notification indicating occurrence of degradation of the sealing member when the determiner determines the voltage value to be lower than the threshold voltage.

10. The vehicle-mounted device according to claim 9, wherein the notifier provides the notification indicating occurrence of degradation of the sealing member when a period during which the determiner has been determining the voltage value to be lower than the threshold voltage is equal to or longer than a predetermined period.

11. The vehicle-mounted device according to claim 1, wherein
the sealing member is fixed to the housing around the opening, and
the at least one pressure sensor is fixed to at least one of an outer surface of the housing or the sealing member at a position such that the at least one pressure sensor is sandwiched between the housing and the sealing member.

12. The vehicle-mounted device according to claim 11, further comprising:
a second protruding member fixed to an inner surface of the cover at a position such that the second protruding member is in contact with the sealing member while the cover is closed, the second protruding member extending toward the housing, wherein
the at least one pressure sensor is fixed to at least one of the outer surface of the housing or the sealing member at a position such that the at least one pressure sensor faces a part of the second protruding member with the sealing member arranged therebetween while the cover is closed.

13. The vehicle-mounted device according to claim 12, wherein
the at least one pressure sensor outputs a voltage value depending on the pressing force, and
the degradation determination device comprises:
a determiner to determine whether the voltage value output from the at least one pressure sensor is lower than a threshold voltage; and
a notifier to provide a notification indicating occurrence of degradation of the sealing member when the determiner determines the voltage value to be lower than the threshold voltage.

14. The vehicle-mounted device according to claim 13, wherein the notifier provides the notification indicating occurrence of degradation of the sealing member when a period during which the determiner has been determining the voltage value to be lower than the threshold voltage is equal to or longer than a predetermined period.

15. The vehicle-mounted device according to claim 11, wherein
the at least one pressure sensor outputs a voltage value depending on the pressing force, and
the degradation determination device comprises:
a determiner to determine whether the voltage value output from the at least one pressure sensor is lower than a threshold voltage; and
a notifier to provide a notification indicating occurrence of degradation of the sealing member when the determiner determines the voltage value to be lower than the threshold voltage.

16. The vehicle-mounted device according to claim 15, wherein the notifier provides the notification indicating occurrence of degradation of the sealing member when a period during which the determiner has been determining the voltage value to be lower than the threshold voltage is equal to or longer than a predetermined period.

17. The vehicle-mounted device according to claim 1, wherein
the at least one pressure sensor outputs a voltage value depending on the pressing force, and
the degradation determination device comprises:
a determiner to determine whether the voltage value output from the at least one pressure sensor is lower than a threshold voltage; and
a notifier to provide a notification indicating occurrence of degradation of the sealing member when the determiner determines the voltage value to be lower than the threshold voltage.

18. The vehicle-mounted device according to claim 17, wherein the notifier provides the notification indicating occurrence of degradation of the sealing member when a period during which the determiner has been determining the voltage value to be lower than the threshold voltage is equal to or longer than a predetermined period.

19. The vehicle-mounted device according to claim 1, wherein the at least one pressure sensor operates on electric power supplied from electronic equipment accommodated in the housing and thus measures the pressing force.

* * * * *